United States Patent [19]
Mayhew et al.

[11] 3,979,987
[45] Sept. 14, 1976

[54] GUIDE SQUARE APPARATUS FOR POWER TOOLS HAVING A BLADE

[76] Inventors: Thomas H. Mayhew, 6255 E. Earll Drive; Marvin G. Rice, 6614 E. Monte Rosa, both of Scottsdale, Ariz. 85251

[22] Filed: Feb. 18, 1975

[21] Appl. No.: 550,461

[52] U.S. Cl. .................................... 83/745; 83/454
[51] Int. Cl.² ............................................. B27B 9/04
[58] Field of Search ............. 83/745, 454, 574, 522; 144/307

[56] References Cited
UNITED STATES PATENTS

| | | | |
|---|---|---|---|
| 1,320,116 | 10/1919 | Bonham | 144/307 |
| 1,911,045 | 5/1933 | Tinnen | 83/454 |
| 2,589,554 | 3/1952 | Killian | 83/522 |
| 2,735,455 | 2/1956 | Forsberg | 83/745 |
| 2,802,493 | 8/1957 | Horneland | 83/574 |
| 3,584,663 | 6/1971 | Yacobucci | 83/298 |

*Primary Examiner*—Donald R. Schran
*Attorney, Agent, or Firm*—H. Gordon Shields

[57] ABSTRACT

Apparatus is disclosed for guiding a power tool having a blade in order to make a straight cut, including a carrier shoe into which the power tool is secured and a wedge to hold the tool in the shoe.

11 Claims, 9 Drawing Figures

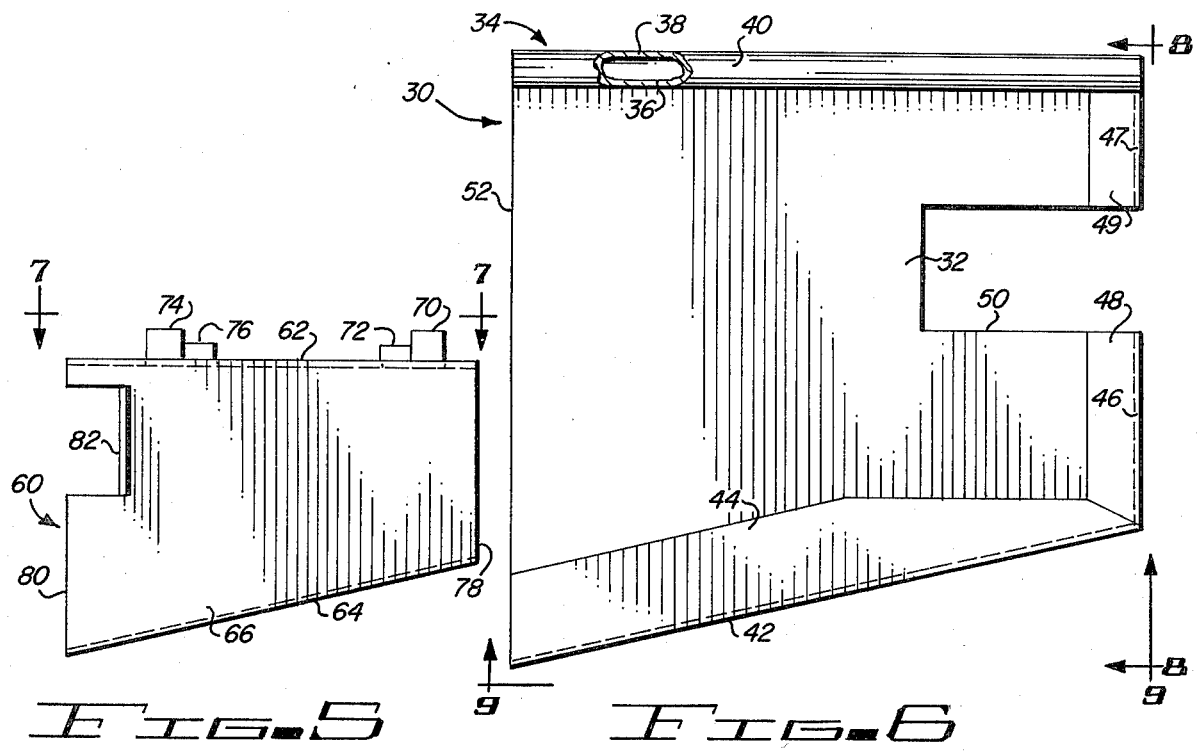
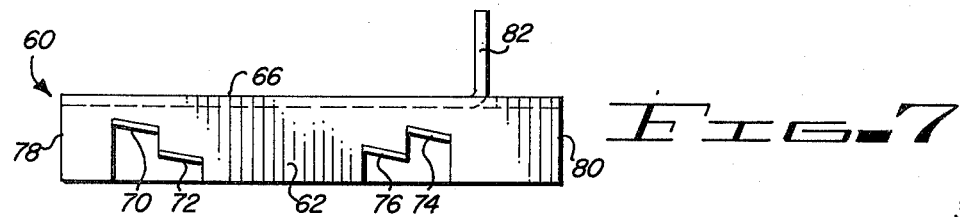
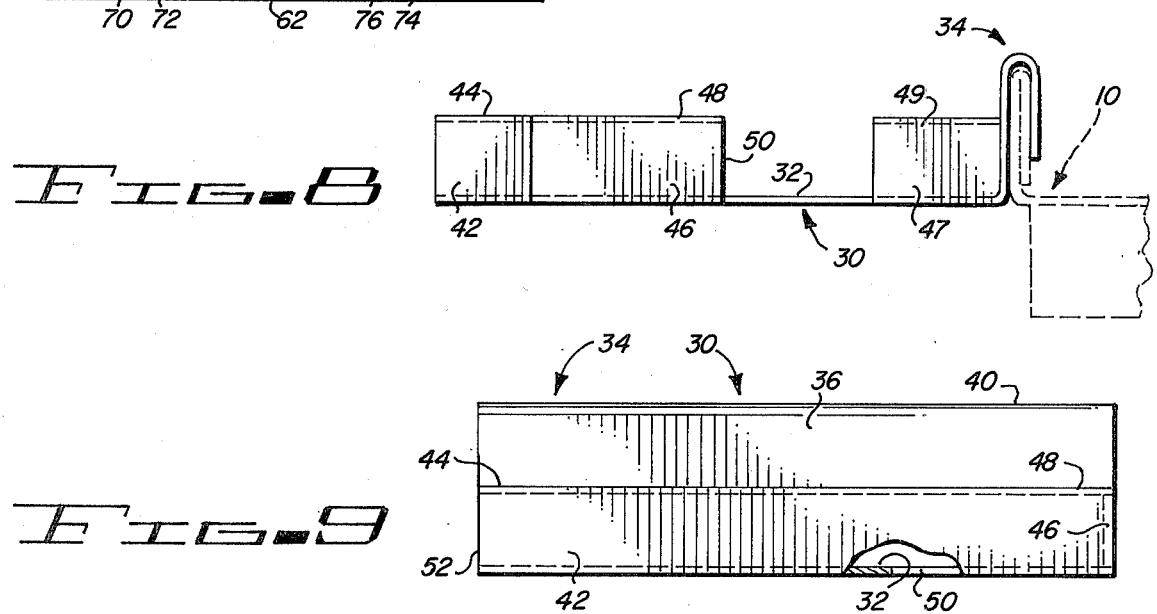

3,979,987

GUIDE SQUARE APPARATUS FOR POWER TOOLS HAVING A BLADE

BACKGROUND OF THE INVENTION

1. Field of the Invention:

This invention relates to guide apparatus for power tools having a blade and, more particularly, to guide apparatus for power tools including a carrier shoe to which may be secured one of several different types of power tools for guiding the power tool along a straight line cut.

2. Description of the Prior Art:

There have been various types of guide apparatus for power tools having blades, such as sabre saws and circular saws. Most of the guide apparatus for the saws have included an integral guide channel secured to the base plate of the saw. The channel cooperates with a guide flange secured to either a table or to the work which is to be sawed. Typically, the guide apparatus of the prior art includes an upwardly extending flange which is secured adjacent to the desired cut at a fixed distance therefrom. The saw, with its guide channel inverted so as to receive the upwardly extending flange, is placed on the guide apparatus with the channel and flange matingly engaged for movement only along the channel. The saw is then guided as the channel moves along the flange. In some cases, there is a guide channel on each side of the sole plate or shoe of the saw.

Since the guide channel is integral with the sole plate or shoe, each saw must have its own respective sole plate or shoe for use with the guide apparatus. That is, the guide apparatus is designed and adaptable only to one specific make of saw. The prior art does not include a universal guide apparatus which can be used with virtually any saw. Since the sole plates or shoes of the saws include the guide channels, the manufacturers of the saws themselves must include the guide apparatus with the basic saw since the sole plate or shoe is normally not a replaceable item separate and apart from the saw itself. The sole plate or shoe of a saw is normally secured to the saw housing and motor as an integral part thereof, and is not normally replaceable. Accordingly, it is necessary that each manufacturer of saws include some type of guide apparatus either as an optional configuration of a saw or else as a standard item with the saw. If the saw is not to be used with the guide apparatus, nevertheless the guide channels are a part of the saw in prior art apparatus.

One of the inherent problems associated with the development of a universal carrier and guide channel apparatus to fit a number of different saws has been the multiplicity of designs of saw sole plates or shoes. The width of the sole plate or shoe varies from about 2 1/8 inches to about 2 7/8 inches for the most common sabre saws. However, there are saws that vary in width from 3¼ inches to 4 inches, and up to about 5½ inches. Moreover, some of the shoes are curved upwardly at the front end, and some are flat without any upward curvature. Some have upwardly extending lips on the side edges of the shoes while others are flat. All in all, it appears that there are almost as many variations in sabre saw sole plates, or shoes, as there are manufacturers of such sabre saws, or even more due to variations between models by the same manufacturer.

SUMMARY OF THE INVENTION

The guide square apparatus disclosed and claimed herein comprises a carrier for power tools, such as for sabre saws, a wedge to hold the tool securely in the carrier, and a guide flange which is secured to the work or to the table that the work is disposed on. The apparatus is quickly and easily used and secured together without the requirement of fasteners such as bolts, or the like, and is adaptable to a variety of manufacturers' products or models.

Among the objects of the present invention are the following:

To provide new and useful guide apparatus for bladed power tools;

To provide new and useful apparatus for guiding bladed power tools along a straight line;

To provide new and useful shoe carrier to fit a multiplicity of models of power tools; and To provide new and useful guide apparatus for bladed power tools having locking means for securing a sabre saw to a guide apparatus.

BRIEF DESCRIPTION OF THE DRAWING

FIG. 5 is a top view of a portion of the apparatus of FIG. 1.

FIG. 6 is an enlarged top view of a portion of the apparatus of FIG. 1.

FIG. 7 is a side view of the apparatus of FIG. 5 taken generally along line 7—7 of FIG. 5.

FIG. 8 is an end view of the apparatus of FIG. 6, taken generally along line 8—8 of FIG. 6.

FIG. 9 is a side view of the apparatus of FIG. 6, taken generally along line 9—9 of FIG. 6.

DESCRIPTION OF THE PREFERRED EMBODIMENT

The bladed power tool guide apparatus of the present invention is discussed and illustrated in the environment of a sabre saw, and will sometimes hereinafter be referred to as a sabre saw guide square apparatus.

Figure 1:
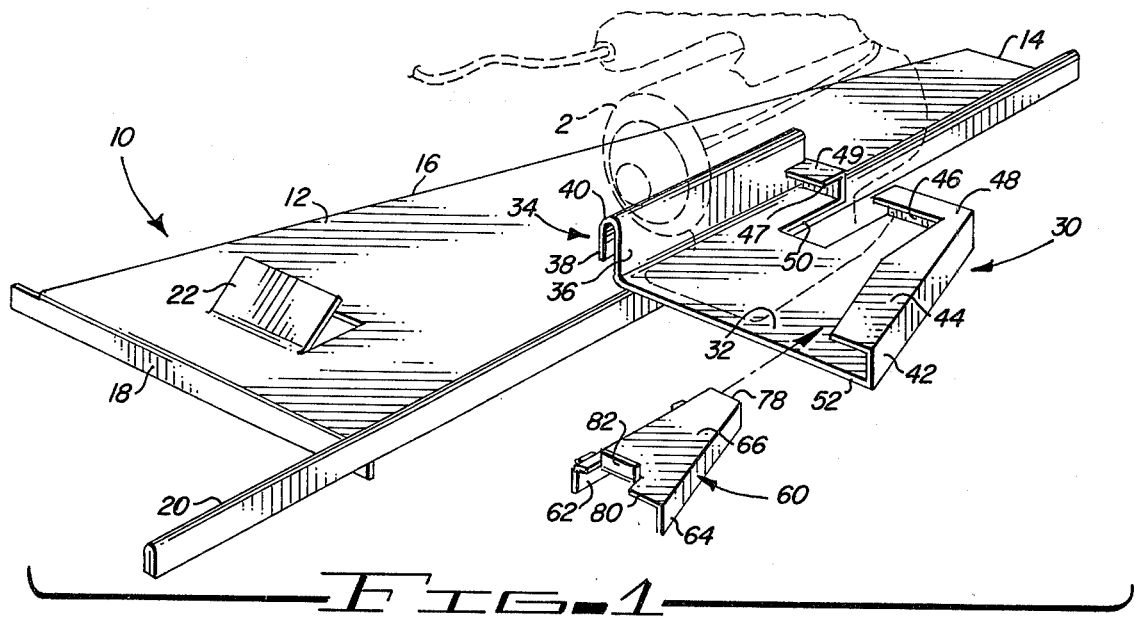
FIG. 1 is a perspective view of the apparatus of the present invention.

The sabre saw guide square apparatus is illustrated in FIG. 1, which comprises a perspective view of the apparatus. The guide square apparatus comprises three primary parts, a guide square 10, a carrier shoe 30, and a wedge 60. The square or guide square 10 is of generally trapezoidal shape and it includes a planar portion 12, bounded by a front edge 14, an outer edge 16, and a pair of flanges, including a base flange 18 and a guide flange 10. The base flange 18 is downwardly extending with respect to the planar portion 12, and is generally parallel to the front edge 14. The guide flange 20 is upwardly extending, and is perpendicular to the base flange 18 and to the planar portion 12. The base flange 18 is designed to extend downwardly with respect to the planar portion 12 and to accordingly abut the wood or other work against which the apparatus is placed for use. The guide flange 20 extends upwardly with respect to the planar portion 12. For purposes of strength, the guide flange 20 includes a double thickness of the material out of which the guide square is fabricated. That is, the metal, out of which the guide square is fabricated, extends upwardly and is then bent back upon itself, with the two portions being juxtaposed with respect to each other to comprise the flange. The flange 20 also extends rearwardly beyond the base flange 18, so as to provide a length greater than the length of the square from the front edge 14 to the base flange 18. The purpose for the increased length is to allow the sabre saw with which the apparatus is used to be positioned with its blade at the beginning of the work, which is at the approximate location of the base flange 18. Accordingly, the sabre saw will be guided over the entire length or width of the work with which it is used.

A hand hold 22 extends upwardly at an angle with respect to the planar portion 12. The hand hold comprises a generally rectangular portion cut on three sides from the planar portion 12 and extending upwardly, open towards the front edge 14. This allows the user of the apparatus to conveniently grasp the hand hold 22 with his left hand to insure that the apparatus remains in place while the user's right hand grasps the saw and moves the saw on the guide flange 20.

Carrier shoe 30, which receives a tool, such as a sabre saw 2, shown in phantom, is also generally trapezoidal shaped and it includes a platform 32, an upwardly extending guide channel 34, which is designed to mate with the guide flange 20 of the square 10, a rear edge 52, an upwardly extending side wall 42, a pair of front wall portions 46 and 47, and several flanges, including side wall flange 44, front wall flange 48, and inner front wall flange 49. The flanges are generally parallel to the platform 32, and they overlie a portion of it. There is also a generally U-shaped cutout portion 50 which receives the blade of a saw. A sabre saw 2 is shown in phantom as disposed on the platform 32, with a blade extending into the cutout portion or notch 50.

The guide channel 34 is a U-shaped member extending upwardly from the platform 32. It includes a pair of sides, an inside portion 36, an outside portion 38, and a rounded top portion 40 which joins the inside and outside portions. The height of the guide channel 34 is slightly greater than that of the guide flange 20 so that the top 40 of the guide channel does not rest on the top of the guide flange. However, the spacing between the inside 36 and the outside 38 portions of the guide channel is substantially the width of the guide flange. Accordingly, the inside portions of the sides, the inside and the outside, of the guide channel are substantially contiguous and adjacent to the guide flange as the apparatus is used. However, the guide channel moves freely along the guide flange, without any binding. If the guide flange and the guide channel were of substantially the same height, with the top portion 40 of the guide channel resting on the top of the guide flange, the saw would tip and the blade of the saw would bind and not cut. Accordingly, there is a space between the top portion 40 of the guide channel and the top of the guide flange 20. This allows the planar portion of the carrier to rest completely, and accordingly to move smoothly, over the work on which the apparatus is disclosed. Similarly, the outside 38 does not rest or contact the planar portion 12 of the guide source 10.

Side wall 42 of the carrier shoe 30 extends upwardly, substantially perpendicular to the platform 32. The side 42 is not parallel to the guide channel 34, but rather is disposed at an angle thereto for a purpose that will be discussed in detail below. The side extends, inwardly toward the front wall portions 46 and 47 of the carrier from the rear edge 52. That is, the length of the rear edge 52 is greater than the combined length of the front wall portion 46, the inner front wall portion 47, and the width of the cutout portion 50.

The side 42 extends substantially perpendicular to the platform 32, which is generally planar in configuration, and at an angle, or other than parallel, to the guide channel 24. The flange 44 extends inwardly from the side wall 42, and is substantially parallel to the platform 32. The front wall 46 and the inner front wall 47 are in substantial alignment with each other and both extend upwardly substantially perpendicular also to the platform 32. Similarly, flange 48 extends from the front wall 46 inwardly and is disposed substantially parallel to the platform 32. The inner wall flange 49 extends also substantially parallel to the platform 32 from the inner front wall 47. The flange 48 and inner flange 49 are generally aligned with each other, and they and the flange 44 are in common plane, which plane is parallel to the platform 32. The flanges all overlie a portion of the platform 32.

The cutout portion 15 is dimensioned so as to receive saw blades secured to various makes of sabre saws. Since the dimensions of sabre saws are not uniform, the widths of the sole plates of the sabre saws vary and accordingly the specific location of the saw blades in the cutout 50 vary from make to make. If a sabre saw, such as sabre saw 2, illustrated in phantom in FIG. 1, is inserted into the carrier shoe 30, with the left hand edge of the sole plate of the saw adjacent the inside portion 36 of the guide channel, the saw blade will extend through the cutout portion 50. Since the saw blade is dimensionally centered with respect to the sole plate of the saw, the width of the cutout portion 50 must vary to be wide enough to receive saw blades of sabre saws of varying sizes.

With a sabre saw, such as saw 2, inserted in the carrier shoe 30, the saw is locked in place with respect to the carrier shoe by a wedge 60. The wedge 60 is shown in FIG. 1 separated from the carrier shoe 30, and ready to be inserted therein. The wedge 60 includes a side portion 62, which may be referred to as the inside, and another side portion 64, which may be referred to as the outside, and a top 66 extending from the upper portions of the respective sides. Side 64 is not parallel to side 62, but rather is disposed at an angle with respect thereto, which angle is substantially the same angle as the angle between the side 42 of the carrier shoe 30 and the side 36 of the guide channel 34. The wedge includes a front edge 78 and a rear edge 80. Extending upwardly from the top 66 at the rear portion of the wedge, and adjacent the rear edge 80, is a thumb hold flange 82. The purpose of the flange 82 is to allow the user of the apparatus to grasp the wedge and either insert it in the carrier shoe 30, underneath the flange 44, or to withdraw the wedge from the carrier shoe.

With a saw 2 in place in the carrier shoe, the wedge 30 is inserted in the carrier and is moved forwardly with respect to the carrier, and to the front portions of the carrier, until the side wall 62 of the wedge is disposed tightly against the side of the saw. At such time, the side 64 is parallel to, and in contiguous relationship, or juxtaposed against, the side 42 of the carrier shoe 30. The overall height of the wedge 60, which is substantially the height of the side walls 62 and 64, is the same as the distance between the flange 44 and the top of the platform 32. That is, when the wedge is in place, it will fit against a sabre saw disposed on the platform 32 of the carrier shoe 30, and a portion of the wedge 60 will be disposed beneath and against the flange 44. With the wedge in place, the saw is held securely within the carrier shoe. The front end of a sabre saw sole plate generally extends upwardly, and will accordingly fit underneath the front flanges 48 and 49 of the carrier shoe and against the front wall portions 46 and 47. In this manner, the sabre saw is secured to the carrier shoe on three sides, with one side of the sabre saw being disposed against the side 36 of the guide channel 34, the front end of the sabre saw being disposed against the front portions 46 and 47 of the carrier shoe and underneath the flanges 48 and 49, and the other side of the sabre saw being disposed against the side 62 of the wedge 60.

Figure 2:
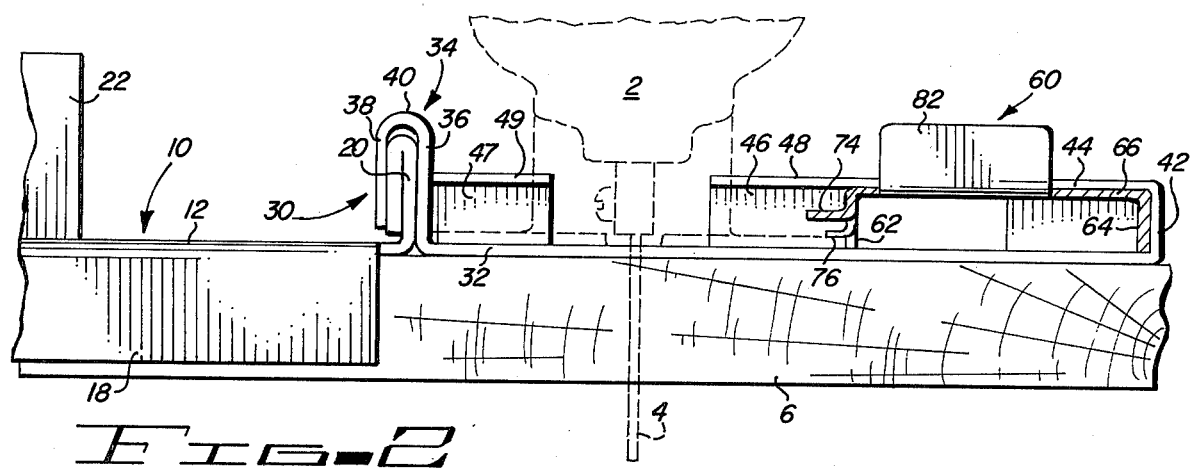
FIG. 2 is an end view of the apparatus of FIG. 1 illustrated in a use environment.

FIG. 2 is an end view of the apparatus of FIG. 1 illustrating the assembly of the apparatus. The guide square 10 is disposed on the wood 6, with the downwardly extending base flange of the guide square disposed against the end of the wood. The carrier shoe 30 is also disposed on the wood, with the guide channel 34 in place over the upwardly extending guide flange 20 of the square 10. The sabre saw 2 is disposed on the platform 32 of the carrier shoe, with one edge of the sabre saw sole plate disposed adjacent the upwardly extending inside portion 36 of the guide channel 34. The opposite side of the soleplate of the sabre saw is disposed against the side 62 of the wedge 60. The wedge 60 is shown inserted in place against the side 42 of the carrier shoe, and beneath flange 44. The side 64 of the wedge 60 is against the side 42 of the carrier shoe, while the top 66 is disposed underneath and adjacent the flange 44. That is, a portion of the top 66 is underneath and juxtaposed against the flange 44.

Clearly shown in FIG. 2 are a pair of tabs or lips, an upper or top lip 74 and a bottom or lower lip 76. The lips or tabs extend outwardly from the side 62 of the wedge 60. As illustrated in FIG. 2, the sole plate of the saw 2 is underneath the lower or bottom lip 76 and against the side 62 of the wedge. In this manner, the sabre saw is securely locked in place in the apparatus.

Extending upwardly from the top 66 of the wedge 60 is the thumb hold flange 82, which is used to conveniently grasp the wedge to move it in and out with respect to the carrier shoe 30. The hand hold 22 of the guide square 10 is also shown extending upwardly from the planar portion 12 of the guide square. The hand hold 22 is used to hold the guide square 10 in place against the wood 6 and to allow the user's other hand to move the saw 2, to which is secured the carrier shoe 30 and the wedge 60. As indicated, the saw is disposed between the upwardly extending side 36 of the guide channel 34, on the one side, and the lip 76 and the side 62 of the wedge 60 on the other side, and, while not clearly shown in FIG. 2, the front portion of the saw will be disposed against the front wall portions 46 and 47 of the carrier shoe 30. The flanges 48 and 49 of the front portions 46 and 47 extend rearwardly and, if the front portion of the sole plate of the saw includes an upwardly extending portion, the upwardly extending portion will be secured underneath the flanges 48 and 49. A saw blade 4 of the sabre saw 2 extends downwardly with respect to the platform 32 of the carrier shoe 30 and downwardly into or through the wood 6.

The guide channel 34 extends over the upwardly extending guide flange 20 of the guide square 10. The upwardly extending guide flange 20 is securely held between the sides 36 and 38 of the guide channel, and the top portion 40 of the guide channel is disposed above the guide flange so as to provide a space therebetween. This prevents the carrier shoe 30 from tipping or tilting as it is moved along the guide flange. Tipping or tilting would in turn result in binding of the saw blade 4. Since the guide channel does not ride on the guide flange, but is merely guided thereon, the platform 32 remains in contact with the top portion or surface of the wood 6 over which the apparatus moves.

Figure 3:
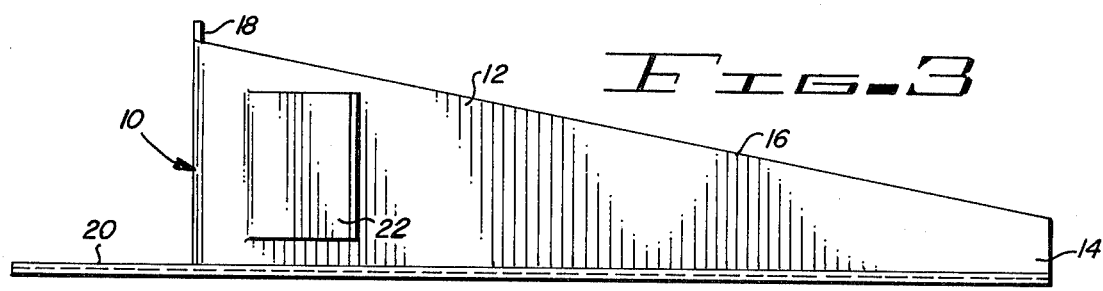
FIG. 3 is a top view of a portion of the apparatus of FIGS. 1 and 2.

FIG. 3 is a top view of the guide square 10. The trapezoidal shape of the guide square 10 is clearly shown in FIG. 3. The front edge 14 is shown substantially parallel to the base flange 18. The outside or outer edge 16 is not parallel to the guide flange 20, but rather is at an angle with respect to it such that the length of the base flange 18 is substantially longer than the front edge 14. Both the front edge and the base flange are intersected by the outer edge 16. Note also in FIG. 3 that the base flange 18 extends outwardly or beyond the outer edge 16. Obviously, the exact dimensions, or relative dimensions, of the guide square 10 may vary as desired. Given a trapezoidal configuration, when the base flange is folded downwardly, a portion will extend beyond the outer edge. The extra could be cut off, if desired.

The hand hold 22 is shown with respect to the planar portion 12 of the guide square 10. The hand hold 22 extends upwardly from the planar portion 12 and forwardly toward the front edge 14. It extends along the planar portion generally parallel to the base flange 18 a distance sufficient to allow the user to firmly grasp the hand hold in order to immobilize the guide square on the work with which it is used.

The guide flange 20 extends from the front edge 14 rearwardly of the base flange 18 at a distance sufficient to allow the saw, positioned on a carrier shoe (see FIGS. 1 and 2) to be positioned with the blade of the saw adjacent or slightly rearwardly of the base flange 18 so as to allow a full cut through the entire material or work with which the apparatus is used. Accordingly, the guide flange 20 extends rearwardly of the base flange 18 a distance which is substantially the length of the carrier shoe from the front walls 46 and 47 to the rear edge 38, which is also substantially the length of the guide channel 34, as illustrated in FIG. 1.

Figure 4:
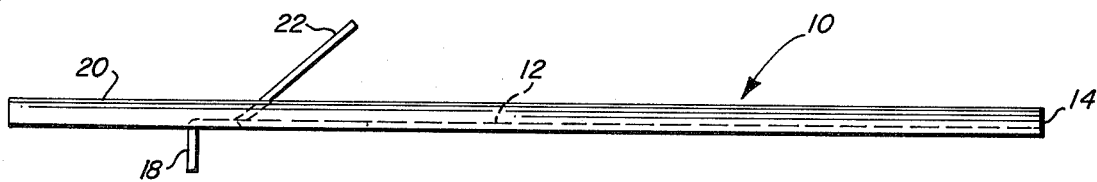
FIG. 4 is a side view of the apparatus of FIG. 3.

FIG. 4 is a side view of the apparatus of FIG. 3. The guide square 10 is illustrated with the base flange 18 clearly shown extending downwardly from the planar portion 12, which portion is shown in dotted line FIG. 4. The guide flange extends upwardly from the planar portion 12 from adjacent the front edge 14 and terminates rearwardly of the downwardly extending base flange 18, as explained in detail above. The hand hold 22 extends upwardly from the planar portion 12 at an acute angle with respect to the planar portion 12, towards the front edge 14 of the guide square. Obviously, the angle at which the hand hold 22 extends is not critical, but is merely a convenient way of providing a hand hold for the apparatus. Similarly, the extent or length of the downwardly extending base flange 18 is not critical, rather it merely should extend downwardly a sufficient distance from the planar portion 12 to allow the guide square to be disposed adjacent the edge of a board or other work with which the apparatus is to be used.

FIG. 5 is a top view of the wedge 60 illustrated in FIGS. 1 and 2. The generally trapezoidal shape of the wedge 60 may be seen, with the front edge 78 substantially parallel to the rear or back edge 80, and the side 62 and side 64 not parallel to each other, but, if continued, would intersect with each other forwardly of the front edge 78. The sides 62 and 64 extend downwardly with respect to the top 66, as indicated by the dotted lines adjacent the sides. Extending inwardly or forwardly from the rear or back edge 80, and upwardly with respect to the top 66, is the thumb hold flange 82, which is substantially similar in purpose to the hand hold 22 of the guide square 10. The thumb hold flange allows the user of the apparatus to position the wedges as desired, in a speedy and efficient manner, and it provides a solid base against which to apply the force against the wedge to securely lock the wedge in place.

Extending outwardly from the inside portion 62, are four lips or tabs, including from top lip 70, front bottom lip 72, rear top lip 74, and rear bottom lip 76. The top lips 70 and 74 are disposed outwardly with respect to the bottom lips 72 and 76. The front lips, including front top or upper lip 70 and front lower or bottom lip 72, are disposed adjacent each other, as are the rear lips, including the rear top or upper lip 74 and the rear bottom or lower lip 76. The purpose of the lips has been explained, above, in conjunction with FIG. 2.

FIG. 6 is an enlarged top view of the carrier shoe 30. The carrier shoe 30 is shown disposed adjacent the wedge 60, which comprises FIG. 5. The carrier shoe 30 is also of a trapezoidal configuration, as is clearly illustrated in its top view in FIG. 6. The front wall portion 46, and the inner front wall portion 47, which two front wall portions are in substantial alignment, are parallel to the rear edge 52. However, the side 42 is not parallel to the guide channel 34, which includes the pair of side portions 36 and 38. If the various sides were continued, the side 42 would intersect the guide channel 34 forwardly of the front wall portions 46 and 47.

With respect to the guide channel 34, the sides 36 and 38 are disposed substantially parallel to each other and spaced apart a sufficient distance to allow the guide flange 20 (see FIGS. 1–4) of the guide square 10 to be received within the channel. The top portion 40 of the guide channel extends between the sides 36 and 38. The front wall portions 46 and 47 extend substantially perpendicular to the guide channel 34. The flanges 48 and 49 are disposed substantially perpendicular to the walls 46 and 47, and are accordingly substantially parallel to the planar portion 32 of the carrier shoe. As previously indicated, while the flanges 48 and 49 are spaced apart, as are the front wall portions 46 and 47, by the cutout 50, the front portions and the flanges are aligned with respect to each other. The cutout 50 extends into the platform 32, which is the planar portion, spaced apart from the guide channel 34 to allow for the insertion therein of a blade of a sabre saw disposed on the carrier shoe. With the front portion of the sabre saw extending underneath the flanges 48 and 49 and against the front wall portions 46 and 47, the saw blade will extend into the cutout portion 50, and the saw will be held securely with its one side against the inside portion 36 of the guide flange 34, and its other side will be held securely against the side 62 and beneath the appropriate lips or tabs, of the wedge 60 (see FIGS. 1, 2, and 5).

The flange 44 extends inwardly from the outer side 42 of the carrier shoe and is generally parallel to the platform or planar portion 32 of the carrier shoe. The flange 44 extends inwardly toward the guide channel 34 a sufficient distance to receive a substantial portion of the wedge 60 underneath it. With a portion of the wedge between the flange 44 and the platform 32, the wedge is held securely between the side 42 and a sabre saw placed in the carrier shoe to lock the sabre saw in place. The flange 44 is generally in the same plane as are the flanges 48 and 49. With a substantial portion of the wedge disposed underneath the flange 44, the wedge is prevented from tipping or from otherwise coming loose during the using of the apparatus.

FIG. 7 is a side view of the apparatus of FIG. 5 taken generally along line 7—7 of FIG. 5, and it comprises a side view of the wedge apparatus 60. In the side view of FIG. 7, the generally rectangular silhouette of the wedge is clearly shown, with the thumb hold flange 82 extending upwardly from the top 66 of the wedge. The front portion or edge 78 and the rear or back portion or edge 80 of the wedge are substantially perpendicular to the top and are parallel to each other. The side 62 is substantially perpendicular to both front and rear edges and also to the top 66.

Extending outwardly from the side 62 are the tabs or lips 70, 72, 74, and 76. The tabs extend outwardly from the sides, which, in FIG. 7, would be outwardly or upwardly from the plane of the drawing. The extension of the tabs or lips is best shown in FIG. 5 with respect to their outward configuration, but the angular disposition of the lips with respect to the side 62 and the top 66 is clearly shown in FIG. 7. The lips, in order to provide additional wedging action with the edges of the saws against which they are disposed, are canted at an angle downwardly from the front of the wedge 78 towards the rear of the wedge, and are accordingly not parallel to top 66 and not parallel to platform 32. That is, there is an angular disposition of the lips along the axis of the wedge from the front to the back. The front of each lip, or that portion of the lip which is closest to the front edge 78 of the wedge, is oriented slightly higher than that portion of the lip which is closer to the rear edge 80 of the wedge. This orientation is clearly shown in FIG. 7. The angular orientation, from front to rear, of each of the lips is substantially the same. That is, each of the lips is substantially parallel to the other lips.

The front top lip 70 and the rear top lip 74 are disposed at substantially the same angle, from front to rear, and they are both substantially the same distance between the top 66 of the wedge and the bottom of the wedge, or the platform 32 (see FIGS. 2 and 6) on which the wedge will be disposed. Similarly, the front bottom lip 72 and the rear bottom lip 76 are disposed at the same angular orientation with respect to the front and the rear of the wedge and with respect to the height or side of the wedge. Moreover, the top and bottom lips are parallel to each other, but there is no alignment with respect to the front and rear top and bottom lips because of their angular orientation.

As the wedge is placed beneath the flange 44 of the carrier shoe 30 (see FIG. 6) and against the side of the sole plate of a sabre saw which is disposed in the carrier shoe, the lips make contact with the sole plate of the saw to provide a double wedging action between the carrier and the saw. That is, the sole plate or shoe of the saw is wedged beneath the tabs on the wedge, and the wedge is in turn in contact with the side of the carrier shoe. If the sole plate or shoe of the saw is relatively flat, the lower lips 72 and 76 will make frictional contact with the saw. If the sole plate or shoe of the saw includes an upwardly rolled outer edge, which is common on various makes of sabre saws, then the upper lips 70 and 74 will make contact with the saw. As illustrated in FIG. 5, the lower lips do not extend outwardly as far from the side 62 of the wedge as do the upper lips 70 and 74. Accordingly, the appropriate wedging action by the physical contact between the lips and the saw may be accomplished without interference by the tabs which do not make direct contact with the saw.

FIG. 8 is an end view of the apparatus of FIG. 6, taken generally along line 8—8 of FIG. 6. The carrier shoe 30 is shown from the front. FIG. 8 clearly shows the relationship between the cutout 50, which receives the blade of a sabre saw which is disposed on the platform or planar portion 32 of the carrier shoe 30, and the adjacent front wall portions, the outer front wall portion 46 and the inner front wall portion 47, and the respective flanges 48 and 49.

Most sabre saws include an upwardly turned portion at the front of the sole plate or shoe of the saw. This upwardly turned portion or upwardly extending portion is disposed frontwardly or forward of the saw blade. The flanges 48 and 49 which extend backwardly or rearwardly from the front wall portion 46 and the inner front wall portion 47, respectively, receive the upwardly turned portion of the saw. That is, the sabre saw is inserted in the carrier shoe 30 by placing the upwardly turned portion beneath the flanges 48 and 49 and against the front wall portions 46 and 47. This will sometimes require that the sabre saw be tipped or tilted downwardly in the front and upwardly in the back to allow the upwardly turned portion to be inserted beneath the flanges and against the front wall portion.

As indicated above, the width of the cutout portion 50 is sufficient to allow the apparatus to be used with a variety of saws, most of which vary in size from make to make, and, even within makes, from model to model. Accordingly, the cutout portion 50 is dimensioned so as to provide accommodation for a variety of sizes. Moreover, the distance between the platform 32 and the flanges 44, 48, and 49 is proportioned so as to accommodate a wide variety of saws.

The side wall 42 is disposed at an obtuse angle with respect to the front wall portions 46 and 47. The angle between the side 42 and the front wall portions is substantially the same as the angle between the front edge 78 and the side 64 of the wedge 60 (see FIGS. 5 and 6).

The guie channel 34 extends upwardly above the flanges 44, 48, and 49, and receives therein the upwardly extending guide flange of the guide square 10, shown in phantom in FIG. 8.

FIG. 9 is a view of the apparatus of FIG. 6 taken generally along line 9—9 thereof, and comprising a side view of carrier shoe apparatus 30. In the side view of FIG. 9, the guide channel 34 extends upwardly above the flanges 44 and 48, both of which are indicated in FIG. 9. The side 36 of the guide channel 34 and the top portion 40 are both shown in the Figure. The side 42 has been broken away in one spot to illustrate the cutout portion 50 and the platform 32. As indicated in the Figure, and also in FIG. 6, the cutout portion 50 extends rearwardly from the front wall 46 about a third of the way to the rear edge 52.

The sabre saw guide square apparatus has been illustrated in detail and the various features thereof, and their cooperation with a sabre saw, have been discussed. The apparatus may also be adapted to be used with a router and also with a circular saw. With a circular saw, the apparatus as shown in FIGS. 1–9 would be substantially a mirror image of that shown because of the orientation of the circular saw blade and the motor housing. That is, the carrier shoe and the wedge would be disposed on the left side, and the guide channel on the right side of the circular saw. However, the apparatus disclosed herein is particularly adapted to be used with a sabre saw. To accommodate a wide variety of saws, having different widths, it may be necessary to, in practice, have at least two wedges usable with a single carrier shoe, but the design of the wedges would be identical except for dimensional differences.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

We claim:

1. Guide apparatus for a power tool having a blade, comprising, in combination:
   carrier shoe means for receiving the power tool, including
   a platform on which the power tool is disposed,
   a guide channel extending substantially perpendicular to the platform,
   front wall means extending upwardly against which the power tool is disposed substantially perpendicular to the platform and to the guide channel,
   a side wall extending upwardly substantially perpendicular to the platform and disposed at an obtuse angle to the front wall means, and including a flange extending inwardly from the side wall spaced apart from and generally parallel to the platform;
   guide square means on which the carrier shoe means is movable, including
   a base flange for aligning and orienting the guide square means,
   a guide flange extending upwardly substantially perpendicular to the base flange and disposed in the guide channel of the carrier shoe means for guiding the carrier shoe means;
   wedge means movable relative to the carrier shoe means and under the flange of the side wall of the carrier shoe means for securing the power tool to the carrier shoe means, including
   a top having a front edge
   a first side wall connected to the top and extending substantially perpendicular to the top and to the front edge of the top, and
   a second side wall connected to the top and extending substantially parallel thereto, but disposed at an obtuse angle with respect to the front edge of the top.

2. The apparatus of claim 1 in which the wedge means is movably disposed beneath the flange and a portion of the top of the wedge means is disposed adjacent the flange.

3. The apparatus of claim 10 in which the obtuse angle between the side wall and the front wall of the carrier shoe means is substantially the same as the obtuse angle between the front edge and the second wall of the wedge means and the said side wall and the second wall are disposed contiguous to each other to provide wedging action to secure the power tool to the carrier shoe means.

4. The apparatus of claim 3 in which the carrier shoe means includes a cut out portion in the platform for receiving a blade of the power tool.

5. The apparatus of claim 4 in which the wedge means includes lip means extending outwardly from the first side wall for biasing the power tool against the platform of the carrier shoe means.

6. The apparatus of claim 5 in which the lip means includes a pair of top lips and a pair of bottom lips for biasing power tools of different dimensional configurations by each said pair of lips.

7. The apparatus of claim 6 in which the pair of top lips extends outwardly from the first side wall of the wedge means a greater distance than the pair of lower lips.

8. The apparatus of claim 7 in which the lip means are substantially perpendicular to the first side wall of the wedge means but at an orientation other than perpendicular to the top of the wedge means.

9. The apparatus of claim 1 in which the front wall means includes a front wall portion and an inner front wall portion spaced apart from each other, and each portion includes one flange of the pair of flanges on the front wall means.

10. The apparatus of claim 9 in which each portion of the front wall means includes a flange generally parallel to and overlying a portion of the platform.

11. The apparatus of claim 10 in which the guide square means includes a planar portion extending substantially perpendicular to and between the base flange and the guide flange.

* * * * *